(12) United States Patent
Kishiyama et al.

(10) Patent No.: US 8,130,812 B2
(45) Date of Patent: Mar. 6, 2012

(54) BASE STATION, USER DEVICE, AND COMMUNICATION CONTROL METHOD

(75) Inventors: Yoshihisa Kishiyama, Yokosuka (JP); Teruo Kawamura, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/866,212

(22) PCT Filed: Jun. 22, 2009

(86) PCT No.: PCT/JP2009/061341
§ 371 (c)(1),
(2), (4) Date: Sep. 29, 2010

(87) PCT Pub. No.: WO2009/157414
PCT Pub. Date: Dec. 30, 2009

(65) Prior Publication Data
US 2011/0007778 A1  Jan. 13, 2011

(30) Foreign Application Priority Data
Jun. 23, 2008  (JP) .................................. 2008-163846

(51) Int. Cl.
*H04B 1/00* (2006.01)
(52) U.S. Cl. ..................................................... 375/132
(58) Field of Classification Search .......... 375/132–133, 375/259–260; 370/329, 477, 491
See application file for complete search history.

(56) References Cited

U.S. PATENT DOCUMENTS

2008/0137716 A1* 6/2008 Lakkis .......................... 375/135
2008/0239992 A1* 10/2008 Krasnyanskiy ................ 370/256
2008/0298434 A1* 12/2008 Nyberg et al. ................. 375/134
2010/0067464 A1 3/2010 Higuchi

FOREIGN PATENT DOCUMENTS

| EP | 2 161 942 A1 | 3/2010 |
| JP | 2006-325264 A | 11/2006 |
| WO | 2007075133 A1 | 7/2007 |
| WO | 2008/114724 A1 | 9/2008 |
| WO | 2009/001713 A1 | 12/2008 |

(Continued)

OTHER PUBLICATIONS

Patent Abstracts of Japan, Publication No. 2006-325264, dated Nov. 30, 2006, 1 page.

(Continued)

*Primary Examiner* — Jean B Corrielus
(74) *Attorney, Agent, or Firm* — Osha • Liang LLP

(57) ABSTRACT

Multiple reference signal transmission bandwidths are defined for system frequency bands and hierarchical reference signal bandwidths are defined for each reference signal transmission bandwidth such that a reference signal bandwidth lower than a highest-order reference signal bandwidth is a division of a higher-order reference signal bandwidth. A base station stores reference signal bandwidth information indicating the hierarchical reference signal bandwidths for each system frequency band; broadcasts the reference signal bandwidth information corresponding to a reference signal transmission bandwidth used by the base station; sets a frequency hopping bandwidth for a reference signal; reports, to a user device, the frequency hopping bandwidth and a reference signal bandwidth as assigned reference signal transmission bandwidth information; sets a reference signal transmission frequency band within the frequency hopping bandwidth based on the reference signal bandwidth information and the assigned reference signal transmission bandwidth information; and receives the reference signal from the user device.

8 Claims, 13 Drawing Sheets

FOREIGN PATENT DOCUMENTS

WO    2009115563 A1    9/2009

OTHER PUBLICATIONS

3GPP TR 25.814 V7.0.0, Jun. 2006, "Physical layer aspects for evolved Universal Terrestrial Radio Access (UTRA)," 126 pages.

International Search Report issued in PCT/JP2009/061341, mailed on Oct. 6, 2009, with translation, 7 pages.

Written Opinion issued in PCT/JP2009/061341, mailed on Oct. 6, 2009, 3 pages.

Extended European Search Report for Application No. 09770124.7, mailed on Feb. 4, 2011 (15 pages).

NTT Docomo et al: "Views on Frequency Hopping Method for SRS", 3GPP Draft; R1-081952 SRS Hoping, 3rd Generation Partnership Project (3GPP), Mobile Competence Centre; 650, Route Des Lucioles; F-06921 Sophia-Antipolis Cedex; France, vol. Ran WG1, No. Kansas City, USA; May 14, 2008.

Nokia Siemens Networks et al: "Frequency Hopping Arrangement for SRS", 3GPP Draft; R1-081864, 3rd Generation Partnership Project (3GPP), Mobile Competence Centre; 650, Route Des Lucioles; F-06921 Sophia-Antipolis Cedex; France, vol. Ran WG1, No. Kansas City, USA; May 14, 2008.

Nokia Siemens Networks et al: "Frequency Hopping Arrangement for SRS", 3GPP Draft; R1-081445, 3rd Generation Partnership Project (3GPP), Mobile Competence Centre; 650, Route Des Lucioles; F-06921 Sophia-Antipolis Cedex; France, vol. Ran WG1, No. Shenzhen, China; Mar. 26, 2008.

"3rd Generation Partnership Project; Technical Specification Group Radio Access Network; Evolved Universal Terrestrial Radio Access (E-UTRA); Physical Channels and Modulation, (Release 8)", 3GPP Standard, 3GPP TS 36.211, 3rd Generation Partnership Project (3GPP), Mobile Competence Centre; 650, Route Des Lucioles; F-06921 Sophia-Antipolis Cedex; France, No. v8.5.0, Dec. 1, 2008.

"3rd Generation Partnership Project; Technical Specification Group Radio Access Network; Evolved Universal Terrestrial Radio Access (E-UTRA); Physical Channels and Modulation, (Release 8)", 3GPP Standard, 3GPP TS 36.211, 3rd Generation Partnership Project (3GPP), Mobile Competence Centre; 650, Route Des Lucioles; F-06921 Sophia-Antipolis Cedex; France, No. v8.3.0, May 1, 2008.

NTT DOCOMO: "Channel-Dependent Packet Scheduling for Single-Carrier FDMA in Evolved UTRA Uplink", 3rd Generation Partnership Project (3GPP), Technical Specification Group (TSG) Radio Access Network (RAN) Working Group 1 (WG1) vol. R1-051390. No. 43, Nov. 7, 2005, pp. 1-8.

Huawei et al.: "Remaining Issues on SRS Hopping", 3rd Generation Partnership Project (3GPP), Technical Specification Group (TSG) Radio Access Network (RAN) Working Group 1 (WG1) vol. R1-082675, Jun. 30, 2008, pp. 1-4.

Huawei: "Remaining Issues on SRS Hopping", 3GPP Draft, R1-082353 Remaining Issues on SRS Hopping, 3rd Generation Partnership Project (3GPP), Mobile Competence Centre; 650, Route Des Lucioles; F-06921 Sophia-Antipolis Cedex; France, vol. Ran WG1, No. Warsaw, Poland; Jun. 24, 2008.

* cited by examiner

BASE STATION, USER DEVICE, AND COMMUNICATION CONTROL METHOD

TECHNICAL FIELD

The present invention generally relates to a radio communication system. More particularly, the present invention relates to a base station, a user device, and a communication control method.

BACKGROUND ART

A successor communication system to wideband code division multiple access (W-CDMA) and high-speed packet access (HSDPA), i.e., Long Term Evolution (LTE), is currently being discussed by 3GPP, a standardization group for W-CDMA. In LTE, orthogonal frequency division multiple access (OFDMA) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDMA, a frequency band is divided into multiple narrow frequency bands (subcarriers) and data are transmitted on the subcarriers. The subcarriers are densely arranged along the frequency axis such that they partly overlap each other but do not interfere with each other. This method enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

An uplink reference signal in E-UTRA indicates a pilot channel that is used for purposes such as synchronization, channel estimation for coherent detection, and measurement of received SINR in transmission power control. The uplink reference signal may also be called a sounding reference signal. The uplink reference signal is a transmission signal known to the receiving end, i.e., the base station, and is embedded at certain intervals in subframes. The base station performs frequency scheduling and adaptive modulation and coding (AMC) based on the uplink reference signal.

FIG. 1 is a drawing illustrating an example of SC-FDMA used for uplink radio access in E-UTRA. In SC-FDMA, a system frequency band is divided into multiple resource blocks each including one or more subcarriers. Each user device (user equipment: UE) is allocated one or more resource blocks. In frequency scheduling, to improve the transmission efficiency or the throughput of the entire system, resource blocks are allocated preferentially to user devices with good channel conditions according to received signal quality or channel quality indicators (CQIs) reported by the user devices for the respective resource blocks based on downlink pilot channels. Frequency hopping where frequency blocks to be used are changed according to a frequency hopping pattern may also be employed.

In FIG. 1, time and frequency resources allocated to different users are represented by different hatchings. For example, a relatively wide frequency band is allocated to UE2 in the first subframe, but a relatively narrow frequency band is allocated to UE2 in the next subframe. Different frequency bands are allocated to the user devices without overlapping.

In SC-FDMA, different time and frequency resources are allocated to user devices in a cell for transmission to achieve orthogonality between the user devices in the cell. Here, the minimum unit of time and frequency resources is called a resource unit (RU). In SC-FDMA, a consecutive frequency band is allocated to each user to achieve single-carrier transmission with a low peak-to-average power ratio (PAPR). Allocation of time and frequency resources in SC-FDMA is determined by a scheduler of the base station based of propagation conditions of respective users and the quality of service (QoS) of data to be transmitted. The QoS includes a data rate, a desired error rate, and a delay. Thus, in SC-FDMA, the system throughput is improved by allocating time and frequency resources providing good propagation conditions to respective users.

Meanwhile, base stations in a system independently allocate time and frequency resources to user devices. Therefore, a frequency band allocated in a cell may partly overlap a frequency band allocated in a neighboring cell. If frequency bands allocated in neighboring cells partly overlap each other, signals interfere with each other and their quality is reduced.

Next, a reference signal in uplink SC-FDMA is described with reference to FIG. 2.

FIG. 2 shows an example of a subframe structure.

Here, a TTI is called a subframe and has a packet length of, for example, 1 ms.

One subframe includes 14 blocks to be FFTed. Two of the 14 blocks are used for transmission of a reference signal (RS) and the remaining 12 blocks are used for transmission of data.

The reference signal is time-division-multiplexed with a data channel. The transmission bandwidth is dynamically changed according to the results of frequency scheduling by the base station. When the transmission bandwidth decreases, the symbol rate decreases and the sequence length of a reference signal to be transmitted in a fixed time period decreases. When the transmission bandwidth increases, the symbol rate increases and the sequence length of a reference signal to be transmitted in a fixed time period increases. When a reference signal is to be transmitted using a narrow band, for example, a 180 kHz band that equals one resource unit or 12 subcarriers, the number of symbols becomes 12. In this case, both the sequence length and the number of sequences become about 12.

Meanwhile, when a reference signal is to be transmitted using a wide band, for example, a 4.5 MHz band that equals 25 resource units or 300 subcarriers, the number of symbols becomes 300. In this case, both the sequence length and the number of sequences become about 300.

DISCLOSURE OF INVENTION

Problems to be Solved by the Invention

In LTE, for example, multiple transmission bandwidths are used. For example, one of 20 MHz, 10 MHz, 5 MHz, and 1.25 MHz may be selected as the transmission bandwidth.

FIG. 3 shows an example of a transmission bandwidth.

When a transmission bandwidth of 20 MHz is used, the transmission bandwidth includes 80 resource blocks (RBs).

When a transmission bandwidth of 10 MHz is used, the transmission bandwidth of 20 MHz is divided into two bandwidths. As shown in FIG. 3, when a transmission bandwidth of 10 MHz is used, the transmission bandwidth includes 40 resource blocks.

When a transmission bandwidth of 5 MHz is used, the transmission bandwidth of 10 MHz is divided into two bandwidths. The transmission bandwidth of 5 MHz includes 20 resource blocks.

When a transmission bandwidth of 1.25 MHz is used, the transmission bandwidth of 5 MHz is divided into five bandwidths. The transmission bandwidth of 1.25 MHz includes 4 resource blocks. One resource block (RB) may instead be 180 kHz.

In FIG. 3, a physical uplink control channel (PUCCH) is a control channel for LTE that is to be frequency-division-multiplexed with a physical uplink shared channel. The number of resource blocks to be allocated to the PUCCH may be varied. In the example shown in FIG. 3, 10 resource blocks are allocated to the PUCCH. In this case, since 10 resource blocks out of 50 resource blocks are allocated to the PUCCH, the percentage of PUCCH is 20%.

Thus, when multiple transmission bandwidths are used, a transmission band to be used is divided into sub transmission bands that have the same bandwidth and are narrower than the transmission band to be used. In other words, multiple transmission bandwidths with a tree structure are defined.

In order for the base station to measure channel quality in the entire frequency band, the user device is preferably configured to transmit a sounding reference signal using the entire frequency band. If a user device located near the base station transmits a sounding reference signal using the entire frequency band, it is highly likely that the base station receives the sounding reference signal with high quality. Meanwhile, if a user device located at the cell edge transmits a sounding reference signal using the entire frequency band, the base station may not always be able to receive the sounding reference signal with high quality.

In order for the base station to be able to receive a sounding reference signal with high quality from a user device located at the cell edge, the sounding reference signal may be transmitted using a frequency band narrower than the entire frequency band. This enables the user device to increase the transmission power of the sounding reference signal. In this case, frequency hopping where the frequency band used to transmit the sounding reference signal is changed at given intervals may also be employed. Compared with a case where the sounding reference signal is transmitted using the entire frequency band, this approach may increase the transmission time but makes it possible to improve the reception quality of the sounding reference signal at the base station.

Here, if the order of frequency hopping for a sounding reference signal to be transmitted in a cell and the order of frequency hopping for a sounding reference signal to be transmitted in a neighboring cell are the same, the sounding reference signals from the cells may interfere with each other. To prevent this problem, different orders of frequency hopping are preferably used for sounding reference signals to be transmitted in different cells.

Also, it is not always appropriate to perform frequency hopping of a sounding reference signal in the entire frequency band.

One object of the present invention is to solve or reduce one or more of the above problems and to provide a base station, a user device, and a communication control method that make it possible to control the transmission frequency band of a reference signal.

Means for Solving the Problems

In an aspect of this disclosure, there is provided a base station for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth. The base station includes a storage unit configured to store reference signal bandwidth information indicating the hierarchical reference signal bandwidths for each of the system frequency bands; a reference signal transmission bandwidth broadcasting unit configured to select the reference signal bandwidth information corresponding to one of the reference signal transmission bandwidths being used by the base station from the storage unit and to broadcast the selected reference signal bandwidth information; a frequency hopping bandwidth setting unit configured to set a frequency hopping bandwidth for frequency hopping of a reference signal; a reporting unit configured to report, to a user device, the frequency hopping bandwidth and one of the reference signal bandwidths as information on an assigned reference signal transmission bandwidth; a reference signal transmission band setting unit configured to set a reference signal transmission frequency band within the frequency hopping bandwidth based on the reference signal bandwidth information broadcast by the reference signal transmission bandwidth broadcasting unit and the information on the assigned reference signal transmission bandwidth reported by the reporting unit; and a receiving unit configured to receive the reference signal to be transmitted from the user device using the reference signal transmission frequency band set by the reference signal transmission band setting unit.

In another aspect of this disclosure, there is provided a user device for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth. The user device includes a reference signal bandwidth receiving unit configured to receive, from a base station, reference signal bandwidth information indicating the hierarchical reference signal bandwidths corresponding to one of the reference signal transmission bandwidths used for the user device; a receiving unit configured to receive, from the base station, a frequency hopping bandwidth for frequency hopping of a reference signal and one of the reference signal bandwidths as information on an assigned reference signal transmission bandwidth; a reference signal transmission band setting unit configured to set a reference signal transmission frequency band within the frequency hopping bandwidth based on the reference signal bandwidth information received by the reference signal bandwidth receiving unit and the information on the assigned reference signal transmission bandwidth received by the receiving unit; and a reference signal transmitting unit configured to transmit the reference signal using the reference signal transmission frequency band set by the reference signal transmission band setting unit.

In still another aspect of this disclosure, there is provided a communication control method performed by a base station communicating with a user device and adapted for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth. The communication control method includes a reference signal transmission bandwidth broadcasting step of selecting, from a storage unit storing reference signal bandwidth information indicating the hierarchical reference signal bandwidths for each of the system frequency bands, the reference signal bandwidth information corresponding to one of the reference signal transmission bandwidths being used by the base station and broadcasting the selected reference signal bandwidth information; a frequency hopping bandwidth setting step of setting a frequency hopping bandwidth for frequency hopping of a reference signal; a reporting step of reporting, to the user device, the frequency hopping bandwidth and one of the reference signal bandwidths as information on an assigned reference signal transmission bandwidth; a reference signal transmission band setting step of setting a reference signal transmission frequency band within the frequency hopping bandwidth based on the reference signal bandwidth information broadcast in the reference signal transmission bandwidth broadcasting step and the information on the assigned reference signal transmission bandwidth reported in the reporting step; and a receiving step of receiving the reference signal to be transmitted from the user device using the reference signal transmission frequency band set in the reference signal transmission band setting step.

Advantageous Effect of the Invention

An aspect of the present invention provides a base station, a user device, and a communication control method that make it possible to control the transmission frequency band of a reference signal.

BEST MODE FOR CARRYING OUT THE INVENTION

Embodiments of the present invention are described below with reference to the accompanying drawings. Throughout the accompanying drawings, the same reference numbers are used for parts having the same functions, and overlapping descriptions of those parts are omitted.

<Radio Communication System>

Figure 1:
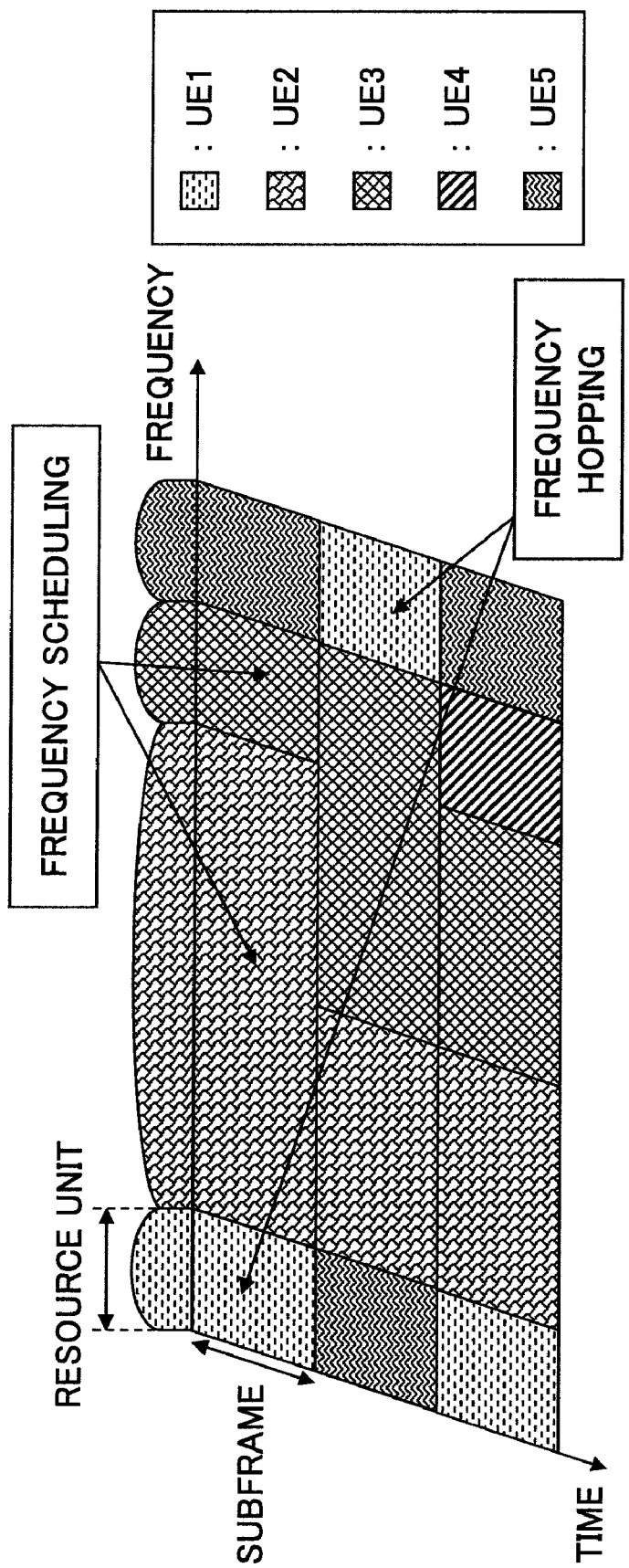
FIG. 1 is a drawing illustrating single-carrier FDMA.
Figure 2:
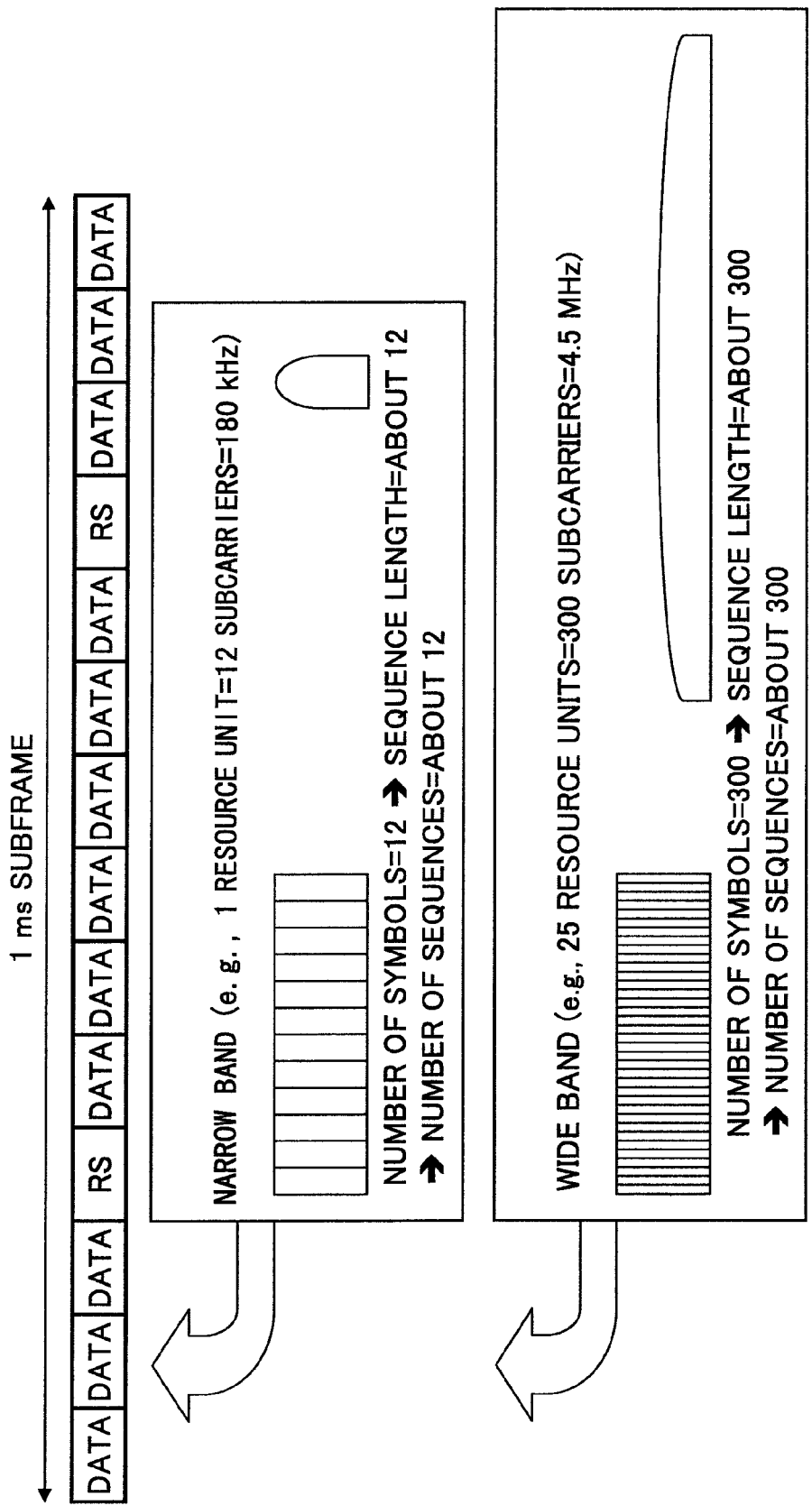
FIG. 2 is a drawing illustrating structures of a sounding reference signal in single-carrier FDMA.
Figure 3:
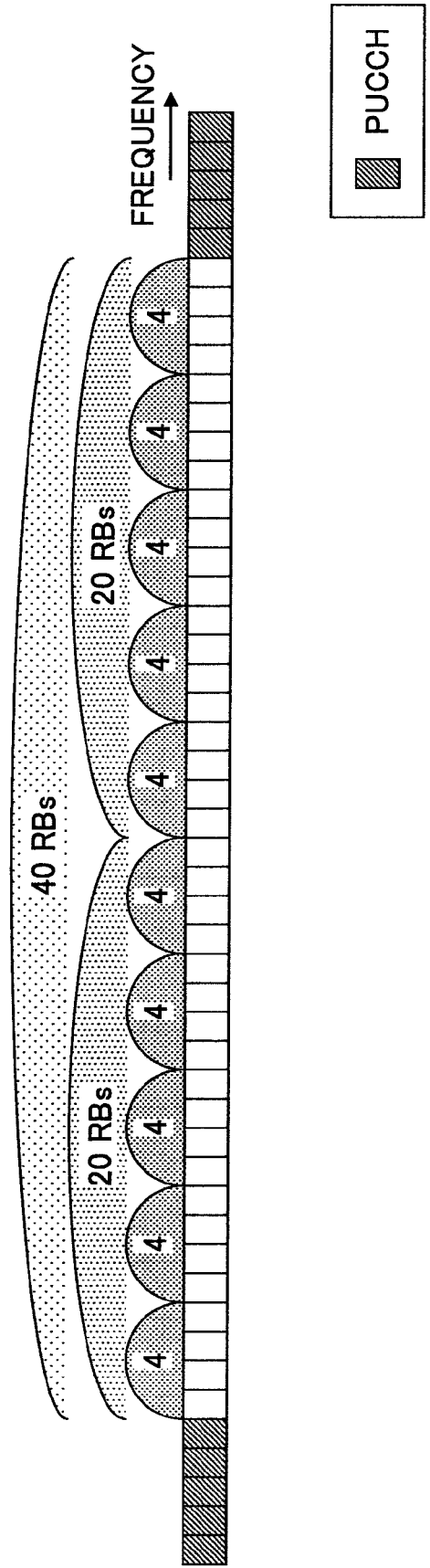
FIG. 3 is a drawing used to describe a transmission bandwidth.
Figure 4:
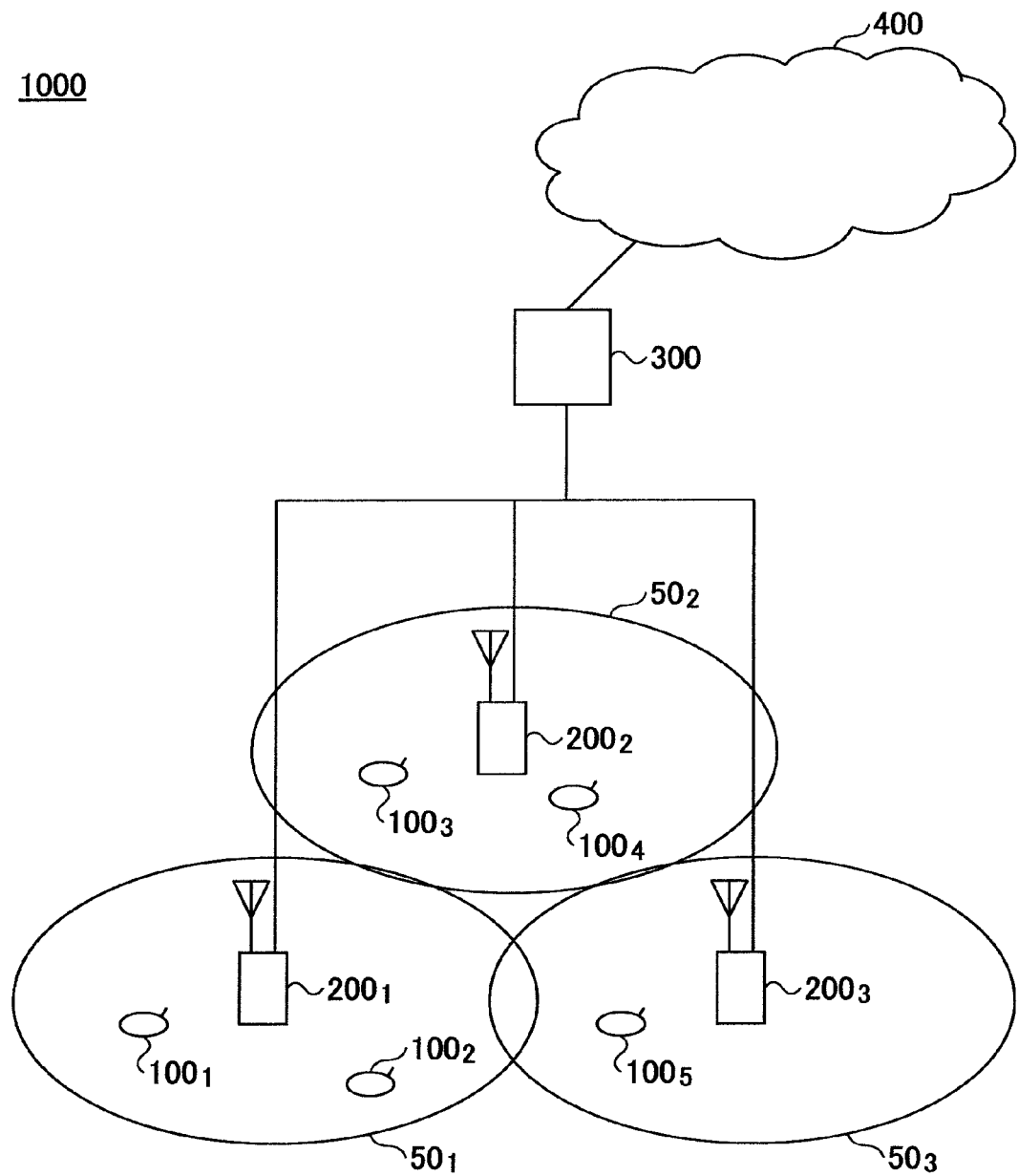
FIG. 4 is a drawing illustrating a radio communication system according to an embodiment of the present invention.

A radio communication system 1000 including user devices and base stations according to an embodiment of the present invention is described below with reference to FIG. 4. In the embodiments, user devices may also be called mobile stations.

The radio communication system 1000 is based on, for example, Evolved UTRA and UTRAN (also called Long Term Evolution or Super 3G). The radio communication system 1000 includes base stations (eNode B: eNB) $200_m$ ($200_1$, $200_2$, $200_3$, ..., $200_m$; where m is an integer greater than 0) and user devices $100_n$ ($100_1$, $100_2$, $100_3$, ..., $100_n$; where n is an integer greater than 0) that communicate with the base stations $200_m$. The base stations $200_m$ are connected to an upper node such as an access gateway 300 and the access gateway 300 is connected to a core network 400. Each of the user devices $100_n$ is in one of cells $50_k$ ($50_1$, $50_2$, ... $50_k$; where k is an integer greater than 0) and communicates with the corresponding one of the base stations $200_m$ according to Evolved UTRA and UTRAN.

Here, it is assumed that some of the user devices $100_n$ have already established communication channels with the base stations $200_m$ and are in communications; and the other user devices $100_n$ have not established communication channels with the base stations $200_m$ and are not in communications.

The base stations $200_m$ ($200_1$, $200_2$, $200_3$, ..., $200_m$) have the same configuration and functions and are therefore called the base station $200_m$, the base station $200_m$, or the base stations $200_m$ in the descriptions below unless otherwise mentioned. The user devices $100_n$ ($100_1$, $100_2$, $100_3$ ... $100_n$) have the same configuration and functions and are therefore called the user device 100, the user device $100_n$, or the user devices $100_n$ in the descriptions below unless otherwise mentioned. The cells $50_k$ ($50_1$, $50_2$, $50_3$, ..., $50_k$) have the same configuration and functions and are therefore called the cell 50, the cell $50_k$, or the cells $50_k$ in the descriptions below unless otherwise mentioned.

The radio communication system 1000 employs orthogonal frequency division multiple access (OFDMA) as a downlink radio access method and single-carrier frequency division multiple access (SC-FDMA) as an uplink radio access method. In OFDMA, as described above, a frequency band is divided into narrow frequency bands (subcarriers) and data are transmitted on the subcarriers. In SC-FDMA, a frequency band is divided into multiple frequency bands and the frequency bands are allocated to different user devices for transmission in order to reduce interference between the user devices.

Communication channels used in Evolved UTRA and UTRAN are described below.

For downlink, a physical downlink shared channel (PDSCH) shared by the user devices $100_n$ and an LTE downlink control channel are used. In downlink, the LTE downlink control channel is used, for example, to report information on user devices to be mapped to the physical downlink shared channel, transport format information for the physical downlink shared channel, information on user devices to be mapped to a physical uplink shared channel, transport format information for the physical uplink shared channel, and acknowledgement information for the physical uplink shared channel; and the physical downlink shared channel is used to transmit user data. Also in downlink, the base stations $200_m$ transmit synchronization signals used by the user devices $100_n$ to perform cell searches.

For uplink, a physical uplink shared channel (PUSCH) shared by the user devices $100_n$ and an LTE uplink control channel are used. There are two types of uplink control channels: the first is an uplink control channel to be time-division-multiplexed with the physical uplink shared channel and the second is an uplink control channel to be frequency-division-multiplexed with the physical uplink shared channel.

In uplink, the LTE uplink control channel is used to report downlink quality information (channel quality indicator: CQI) used for scheduling and adaptive modulation and coding (AMC) of the physical downlink shared channel and to transmit acknowledgement information (HARQ ACK information) for the physical downlink shared channel. Meanwhile, the physical uplink shared channel is used to transmit user data.

The physical uplink control channel may also be used to transmit, in addition to the CQI and the acknowledgement information, a scheduling request for requesting allocation of resources of an uplink shared channel and a release request used in semi-persistent scheduling. Here, allocation of resources of an uplink shared channel indicates a process where a base station reports to a user device by using the physical downlink control channel in a given subframe that the user device is allowed to communicate using the uplink shared channel in a subsequent subframe.

In the radio communication system 1000 of this embodiment, the user device 100 transmits a sounding reference signal using a frequency band narrower than the entire frequency band assigned to the system to which the user device 100 belongs. The base station 200 performs frequency scheduling and adaptive modulation and coding based on the sounding reference signal transmitted from the user device 100. The user device 100 may use frequency hopping where the transmission frequency band (transmission frequency) used to transmit the sounding reference signal is changed at given intervals. Also, the user device 100 may be configured to use a bandwidth narrower than or equal to the bandwidth assigned to the system as a frequency hopping bandwidth used for the frequency hopping of the sounding reference signal. The frequency hopping bandwidth may be specified by the base station 200.

The transmission bandwidth of the sounding reference signal may be specified by the base station 200 or may be determined by the user device 100. For example, the user device 100 may be configured to determine the transmission bandwidth of the sounding reference signal based on the capability of the user device 100. In this case, the user device 100 may be configured to report the determined transmission bandwidth of the sounding reference signal to the base station 200. Alternatively, the base station 200 may be configured to determine the transmission bandwidth of the sounding reference signal based on the location of the user device 100 in a cell. For example, the base station 200 may be configured to decrease the transmission bandwidth of the sounding reference signal as the location of the user device 100 becomes closer to the cell edge. In other words, the base station 200 may be configured to make the transmission bandwidth of the sounding reference signal for a user device located at the cell edge narrower than the transmission bandwidths of the sounding reference signal for user devices other than the user device located at the cell edge. Making the transmission bandwidth of the sounding reference signal for a user device located at the cell edge narrower than the transmission bandwidths of the sounding reference signal for user devices other than the user device located at the cell edge enables the user device at the cell edge to increase the transmission power of the sounding reference signal. Increasing the transmission power of the sounding reference signal, in turn, makes it possible to improve the reception quality at the base station of the sounding reference signal transmitted from the user device located at the cell edge.

<User Device>

Figure 5:
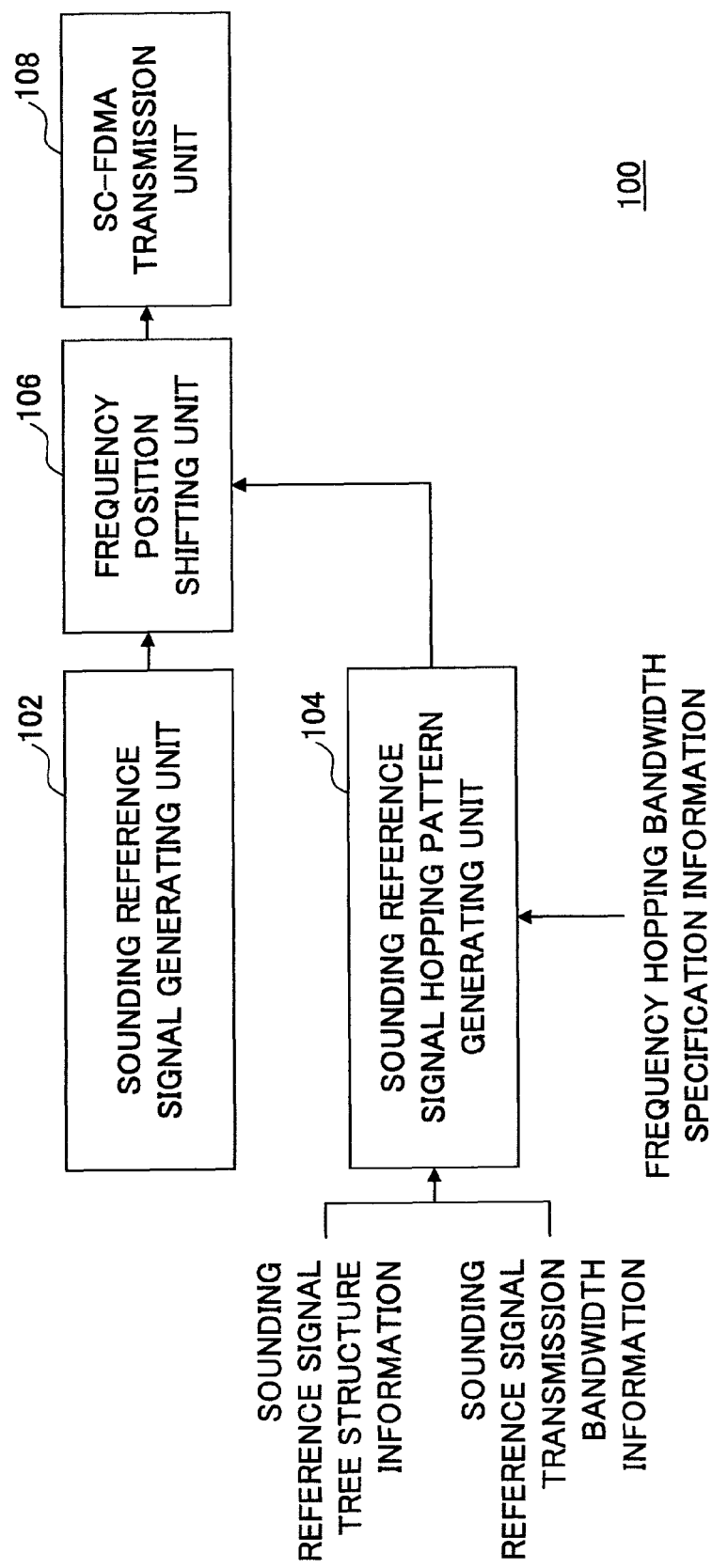
FIG. 5 is a partial block diagram of a user device according to an embodiment of the present invention.

FIG. 5 shows the user device 100 of this embodiment.

The user device 100 of this embodiment includes a sounding reference signal generating unit 102, a sounding reference signal hopping pattern generating unit 104, a frequency position shifting unit 106, and an SC-FDMA transmission unit 108.

The sounding reference signal generating unit 102 generates a sounding reference signal. For example, a constant amplitude and zero auto-correlation (CAZAC) sequence may be used as a signal sequence for the sounding reference signal.

The sounding reference signal hopping pattern generating unit 104 receives sounding reference signal tree structure information and sounding reference signal transmission bandwidth information.

Figure 6:
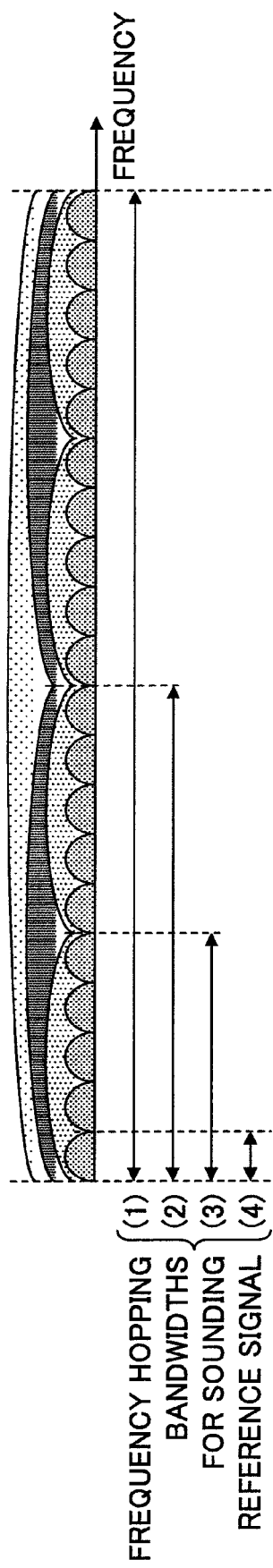
FIG. 6 is a drawing illustrating exemplary frequency hopping bandwidths according to an embodiment of the present invention.

The sounding reference signal tree structure information and the sounding reference signal transmission bandwidth information are described with reference to FIG. 6.

The sounding reference signal tree structure information includes combinations of bandwidths and frequency positions for the sounding reference signal. In other words, the sounding reference signal tree structure information indicates bandwidths (or frequency bands) within which the transmission frequency of the sounding reference signal transmitted from the user device 100 is changed. The combinations of bandwidths and frequency positions for the sounding reference signal may be defined for respective transmission bandwidths. The bandwidths for the sounding reference signal, for example, include (1) the supported maximum system bandwidth, (2) a half bandwidth obtained by dividing the maximum system bandwidth into two parts, (3) one-fourth bandwidth obtained by dividing the half bandwidth into two parts, and (4) a one-twentieth bandwidth obtained by dividing the one-fourth bandwidth into five parts. In this case, the bandwidths for the sounding reference signal are defined as a tree structure of three levels including the half bandwidth, the one-fourth bandwidth, and the one-twentieth bandwidth. In other words, the combinations of bandwidths and frequency positions for the sounding reference signal are represented by a hierarchical structure of three levels including the half bandwidth, the one-fourth bandwidth, and the one-twentieth bandwidth.

The sounding reference signal transmission bandwidth information indicates the transmission bandwidth, in the sounding reference signal tree structure, of the sounding reference signal to be transmitted by the user device 100. For example, the sounding reference signal transmission bandwidth information indicates one of the bandwidths (1) through (4) described above.

The sounding reference signal hopping pattern generating unit 104 generates information indicating combinations of frequency hopping bandwidths for the sounding reference signal and patterns (frequency hopping patterns) for changing the transmission frequency of the sounding reference signal based on the sounding reference signal tree structure information and the sounding reference signal transmission bandwidth information. In the descriptions below, it is assumed that a parameter "b" indicates one of the combinations. For example, when b=0, the maximum system bandwidth is used as the frequency hopping bandwidth. In this case, the transmission frequency of the sounding reference signal is changed within the maximum system bandwidth. When b=1, the half bandwidth is used as the frequency hopping bandwidth. In this case, the transmission frequency of the sounding reference signal is changed within the half bandwidth. When b=2, the one-fourth bandwidth is used as the frequency hopping bandwidth. In this case, the transmission frequency of the sounding reference signal is changed within the one-fourth bandwidth. When b=3, the one-twentieth bandwidth is used as the frequency hopping bandwidth. In this case, the transmission frequency of the sounding reference signal is changed within the one-twentieth bandwidth.

The sounding reference signal hopping pattern generating unit 104 generates (or selects) a frequency hopping pattern based on frequency hopping bandwidth specification information reported from the base station 200 and the information indicating the combinations of frequency hopping bandwidths and patterns (frequency hopping patterns) for changing the transmission frequency of the sounding reference signal. The frequency hopping bandwidth specification information reported from the base station 200 indicates one of the combinations of frequency hopping bandwidths for the sounding reference signal and patterns (frequency hopping patterns) for changing the transmission frequency of the sounding reference signal. In other words, the frequency hopping bandwidth specification information indicates the value of the parameter "b".

Frequency Hopping

Example 1

Figure 7:
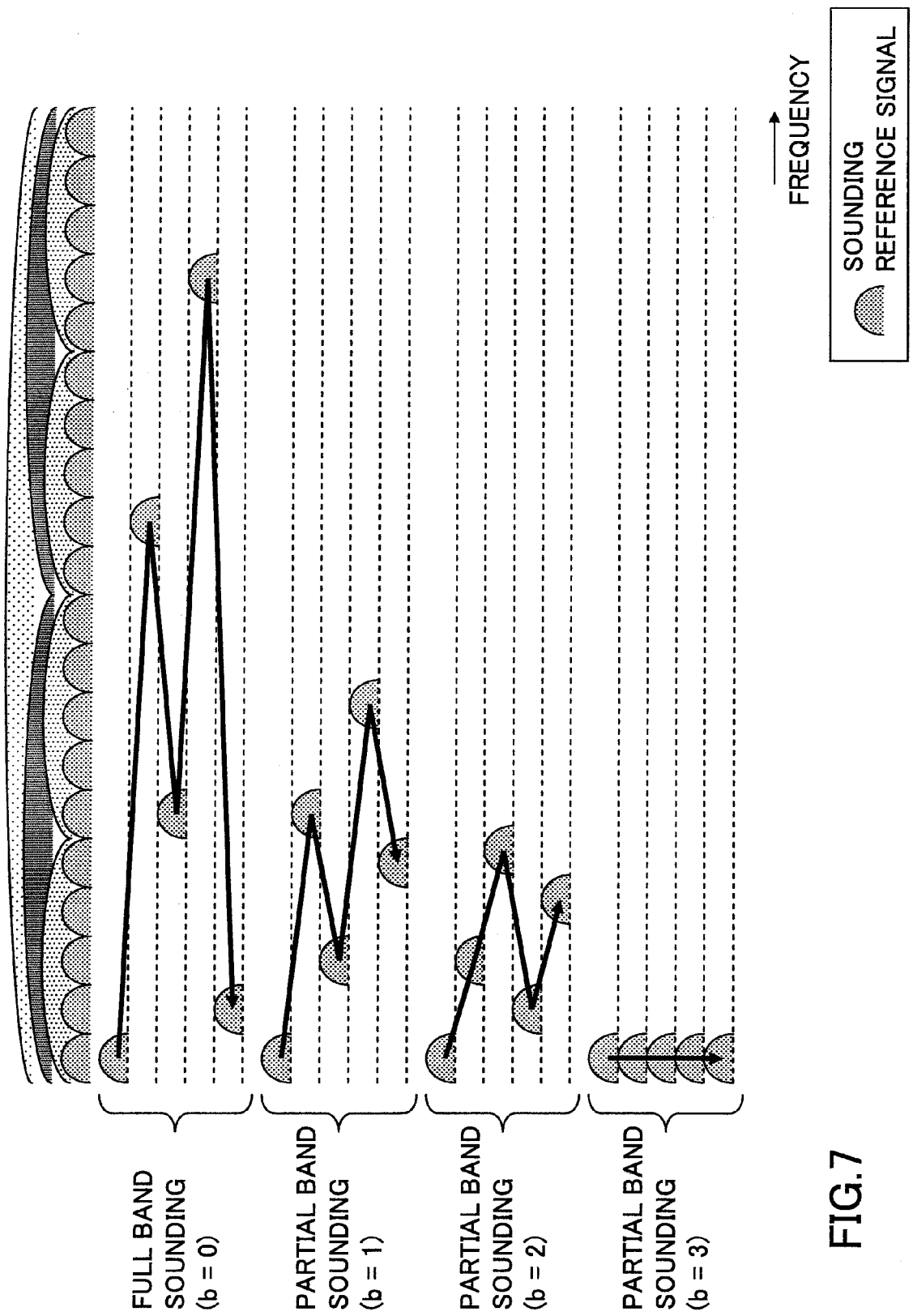
FIG. 7 is a drawing illustrating exemplary frequency hopping bandwidths corresponding to a transmission bandwidth of a sounding reference signal according to an embodiment of the present invention.

FIG. 7 shows an example where the user device 100 uses the narrowest bandwidth as the transmission bandwidth of the sounding reference signal. In this example, the sounding reference signal hopping pattern generating unit 104 selects one of four frequency hopping patterns based on the frequency hopping bandwidth specification information reported from the base station 200. The narrowest bandwidth is, for example, the one-twentieth bandwidth. The base station 200 reports the frequency hopping bandwidth specification information, for example, by sending a signal. The signal may include two bits of information indicating one of the four frequency hopping patterns. In FIG. 7, the horizontal axis indicates frequency and the vertical axis indicates time.

Frequency Hopping

Example 2

Figure 8:
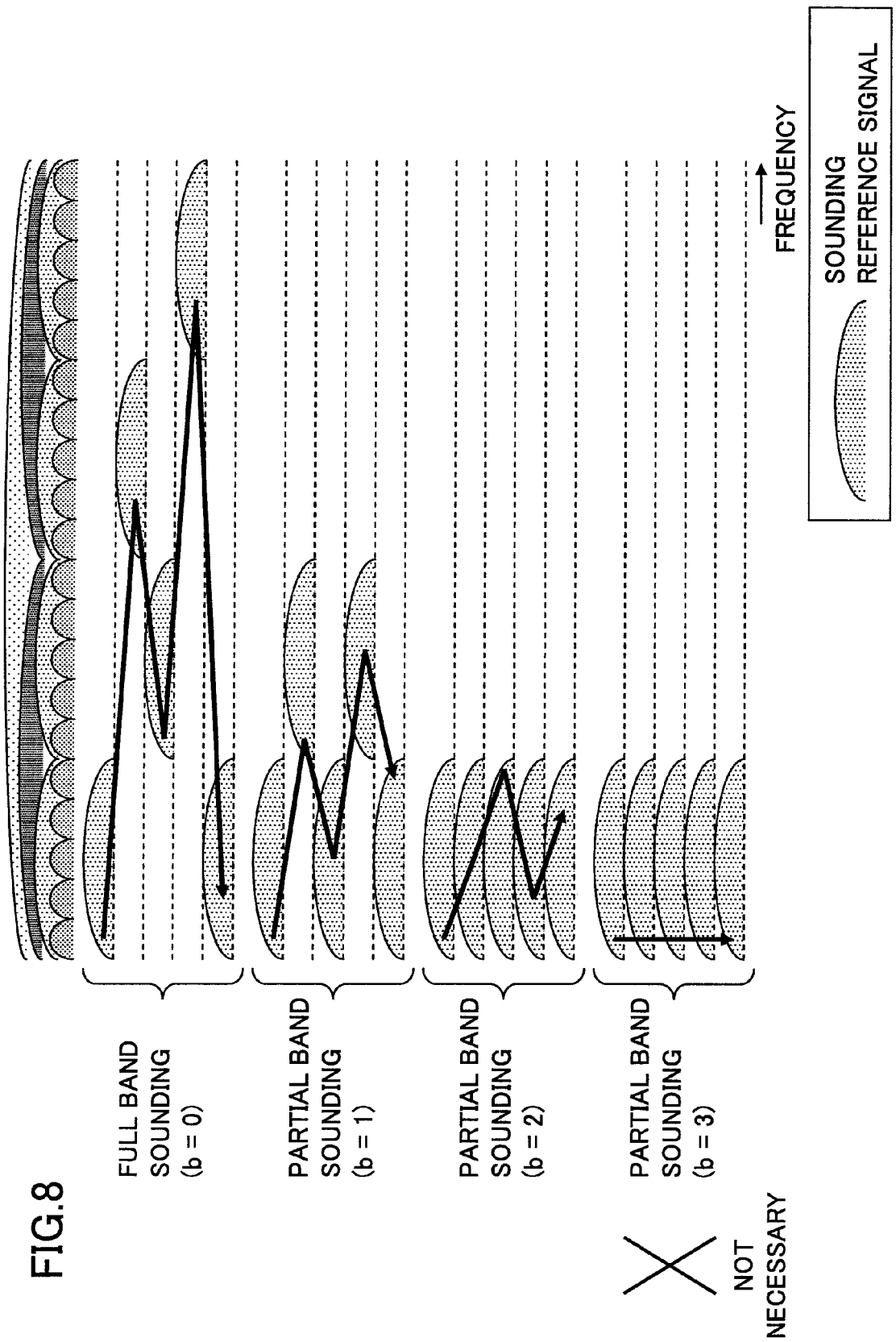
FIG. 8 is a drawing illustrating exemplary frequency hopping bandwidths corresponding to a transmission bandwidth of a sounding reference signal according to an embodiment of the present invention.

FIG. 8 shows another example where the user device 100 uses a bandwidth wider than the narrowest bandwidth as the transmission bandwidth of the sounding reference signal. In this example, the sounding reference signal hopping pattern generating unit 104 selects one of three frequency hopping patterns based on the frequency hopping bandwidth specification information reported from the base station 200. The bandwidth wider than the narrowest bandwidth is, for example, the one-fourth bandwidth. The base station 200 reports the frequency hopping bandwidth specification information, for example, by sending a signal. The signal may include two bits of information indicating one of the three frequency hopping patterns. In FIG. 8, the horizontal axis indicates frequency and the vertical axis indicates time.

Frequency Hopping

Example 3

Figure 9:
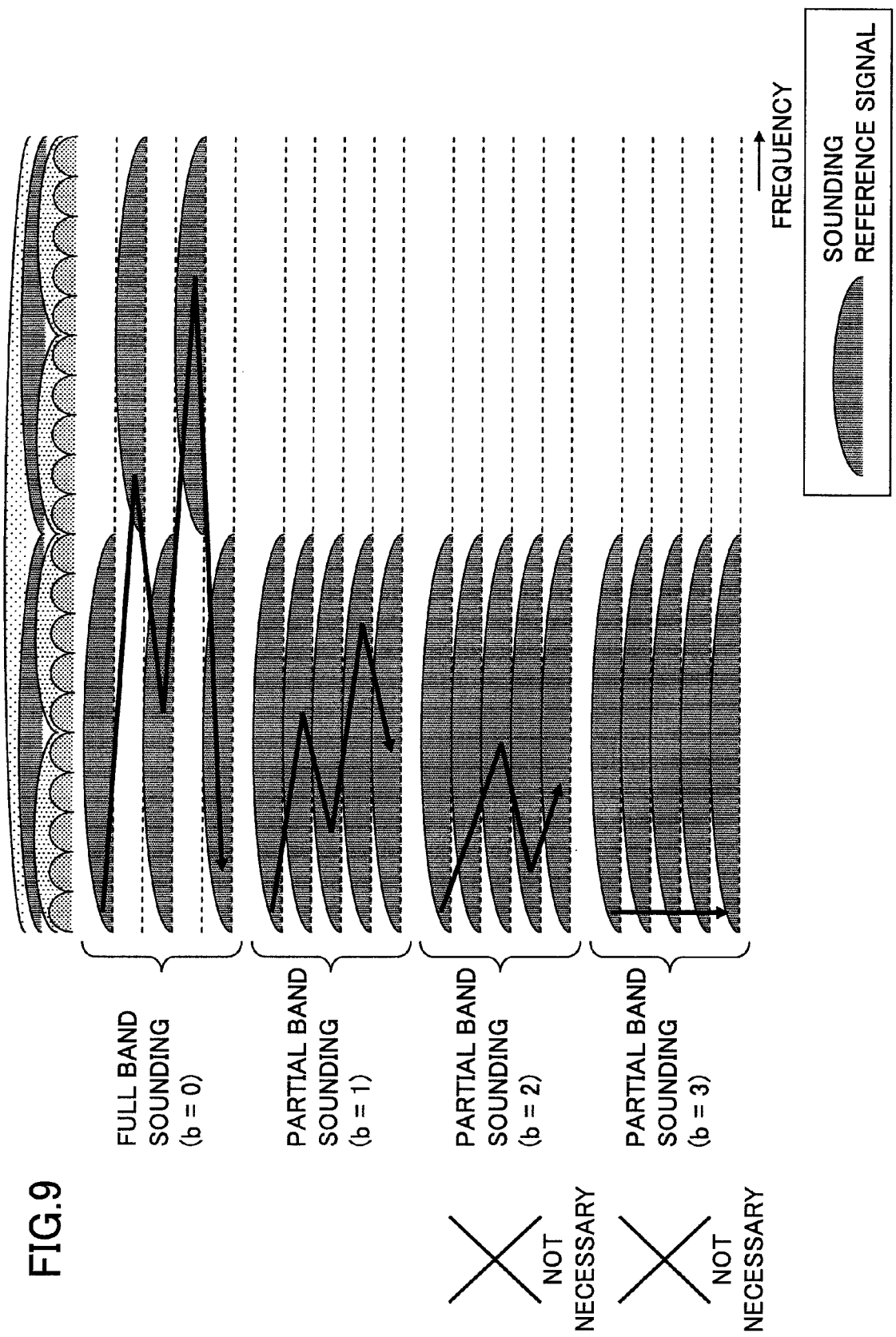
FIG. 9 is a drawing illustrating exemplary frequency hopping bandwidths corresponding to a transmission bandwidth of a sounding reference signal according to an embodiment of the present invention.

FIG. 9 shows another example where the user device 100 uses a bandwidth still wider than the narrowest bandwidth as the transmission bandwidth of the sounding reference signal. In this case, the sounding reference signal hopping pattern generating unit 104 selects one of two frequency hopping patterns based on the frequency hopping bandwidth specification information reported from the base station 200. The bandwidth still wider than the narrowest bandwidth is, for example, the half bandwidth. The base station 200 reports the frequency hopping bandwidth specification information, for example, by sending a signal. The signal may include one bit of information indicating one of the two frequency hopping patterns. In FIG. 9, the horizontal axis indicates frequency and the vertical axis indicates time.

The frequency position shifting unit 106 is connected to the sounding reference signal generating unit 102 and the sounding reference signal hopping pattern generating unit 104. The frequency position shifting unit 106 shifts the frequency position of the sounding reference signal input from the sounding reference signal generating unit 102 according to the frequency hopping pattern input from the sounding reference signal hopping pattern generating unit 104. After the frequency position is shifted, the sounding reference signal is input to the SC-FDMA transmission unit 108.

The SC-FDMA transmission unit 108 is connected to the frequency position shifting unit 106. The SC-FDMA transmission unit 108 modulates the sounding reference signal input from the frequency position shifting unit 106 based on the transmission frequency of the sounding reference signal and transmits the modulated sounding reference signal.

<Base Station>

Figure 10:
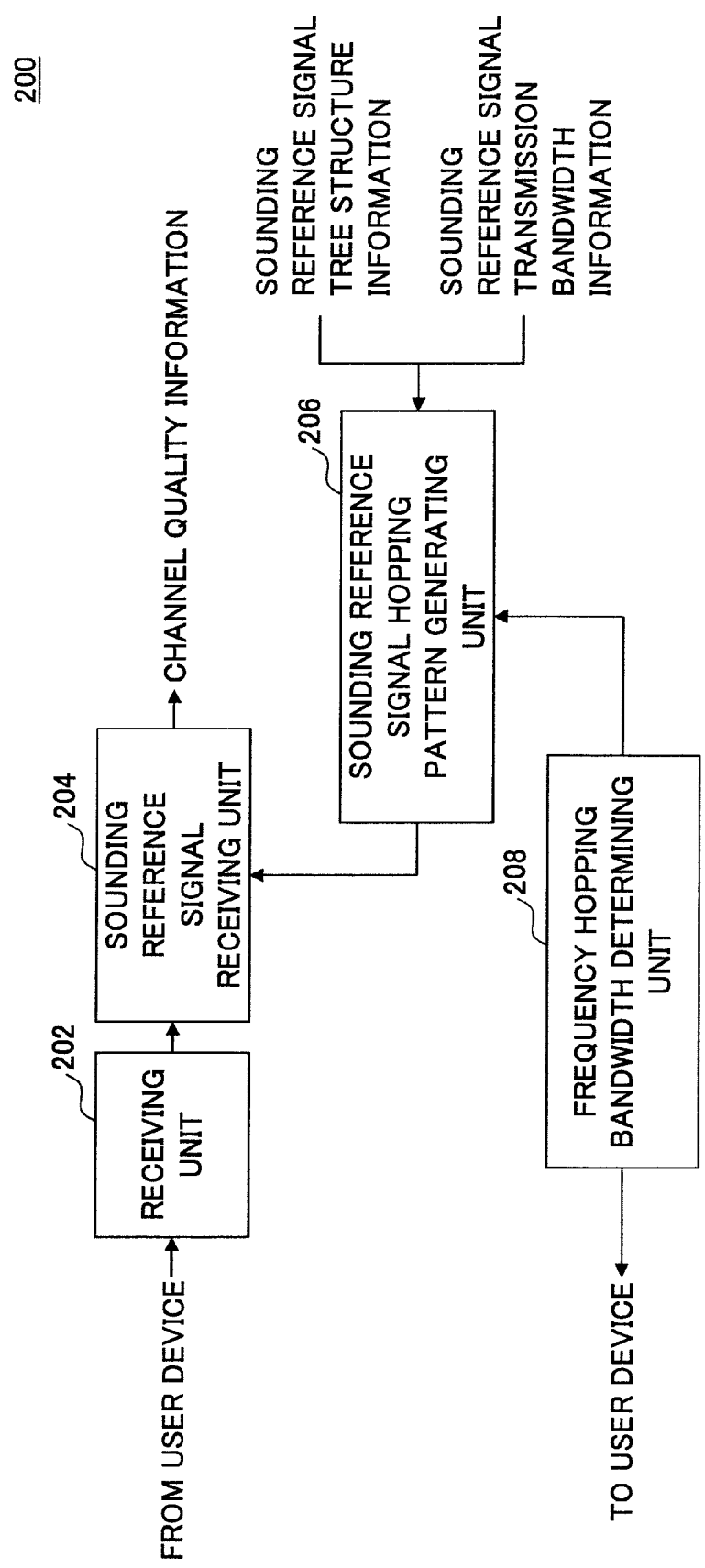
FIG. 10 is a partial block diagram of a base station according to an embodiment of the present invention.

The base station 200 of this embodiment is described below with reference to FIG. 10.

The base station 200 of this embodiment includes a receiving unit 202, a sounding reference signal receiving unit 204, a sounding reference signal hopping pattern generating unit 206, and a frequency hopping bandwidth determining unit 208.

The base station 200 stores the sounding reference signal tree structure information and the sounding reference signal transmission bandwidth information. The base station 200 reports the sounding reference signal tree structure information and the sounding reference signal transmission bandwidth information to the user device 100. For example, the base station 200 broadcasts the sounding reference signal tree structure information and the sounding reference signal transmission bandwidth information to the user devices 100 in an area covered by the base station 200 or reports the sounding reference signal tree structure information and the sounding reference signal transmission bandwidth information as dedicated control information.

The receiving unit 202 receives an uplink signal transmitted from the user device 100. Then, the receiving unit 202 inputs the received uplink signal to the sounding reference signal receiving unit 204.

The frequency hopping bandwidth determining unit 208 determines a frequency hopping bandwidth for the sounding reference signal. For example, the frequency hopping bandwidth determining unit 208 may determine the frequency hopping bandwidth such that the interference with a sounding reference signal transmitted from a user device in a neighboring cell is reduced. For this purpose, the frequency hopping bandwidth determining unit 208 may employ an interference coordination scheme. The frequency hopping bandwidth determining unit 208 reports the determined frequency hopping bandwidth to the user device 100. For example, the frequency hopping bandwidth determining unit 208 may report the determined frequency hopping bandwidth as control information to the user device 100 via dedicated signaling. The frequency hopping bandwidth determining unit 208 also inputs the determined frequency hopping bandwidth to the sounding reference signal hopping pattern generating unit 206.

The sounding reference signal hopping pattern generating unit 206 is connected to the frequency hopping bandwidth determining unit 208. The sounding reference signal hopping pattern generating unit 206 receives the sounding reference signal tree structure information and the sounding reference signal transmission bandwidth information. The sounding reference signal hopping pattern generating unit 206 generates a hopping pattern for the sounding reference signal based on the received information. Then, the sounding reference signal hopping pattern generating unit 206 inputs the generated hopping pattern to the sounding reference signal receiving unit 204.

The sounding reference signal receiving unit 204 is connected to the receiving unit 202 and the sounding reference signal hopping pattern generating unit 206, and receives the sounding reference signal according to the hopping pattern input from the sounding reference signal hopping pattern generating unit 206.

The base station 200 performs frequency scheduling and adaptive modulation and coding (AMC) based on the received sounding reference signal.

<Process in Radio Communication System>

Figure 11:
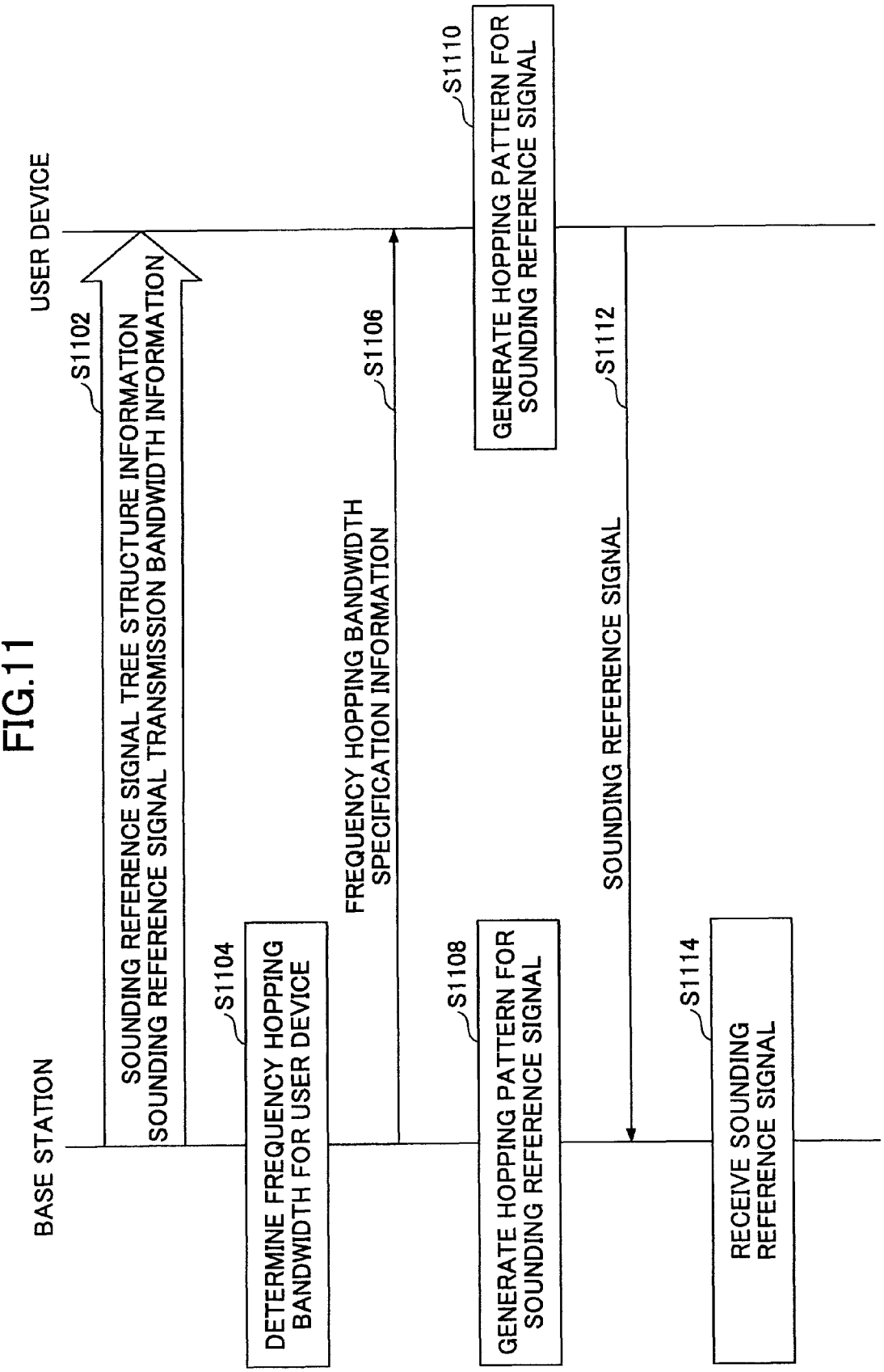
FIG. 11 is a sequence chart showing a process in a radio communication system according to an embodiment of the present invention.

FIG. 11 is a sequence chart showing a process in the radio communication system 1000 of this embodiment.

The base station 200 reports the sounding reference signal tree structure information and the sounding reference signal transmission bandwidth information to the user device 100 (S1102). The base station 200 may broadcast the sounding reference signal tree structure information and the sounding reference signal transmission bandwidth information to the user devices 100 in the cell or may report them as dedicated control information.

Next, the base station 200 determines a frequency hopping bandwidth for the user device 100 (step S1104). For example, the frequency hopping bandwidth determining unit 208 may determine the frequency hopping bandwidth for the user device 100 based on the supported system bandwidth of the base station 200 and/or the frequency hopping bandwidth used in a neighboring cell.

The base station 200 transmits frequency hopping bandwidth specification information to the user device 100 (step S1106). The frequency hopping bandwidth specification information includes information indicating the frequency hopping bandwidth for the user device 100.

The base station 200 generates a hopping pattern for the sounding reference signal (step S1108).

Similarly, the user device 100 generates a hopping pattern for the sounding reference signal based on the frequency hopping bandwidth specification information transmitted from the base station 200 (step S1110).

Then, the user device 100 transmits the sounding reference signal (step S1112).

The base station 200 receives the sounding reference signal transmitted from the user device 100 (step S1114). For example, the base station 200 waits for the sounding reference signal according to the hopping pattern for the sounding reference signal.

Then, steps S1108 through S1114 are repeated according to the hopping pattern for the sounding reference signal.

Figure 12:
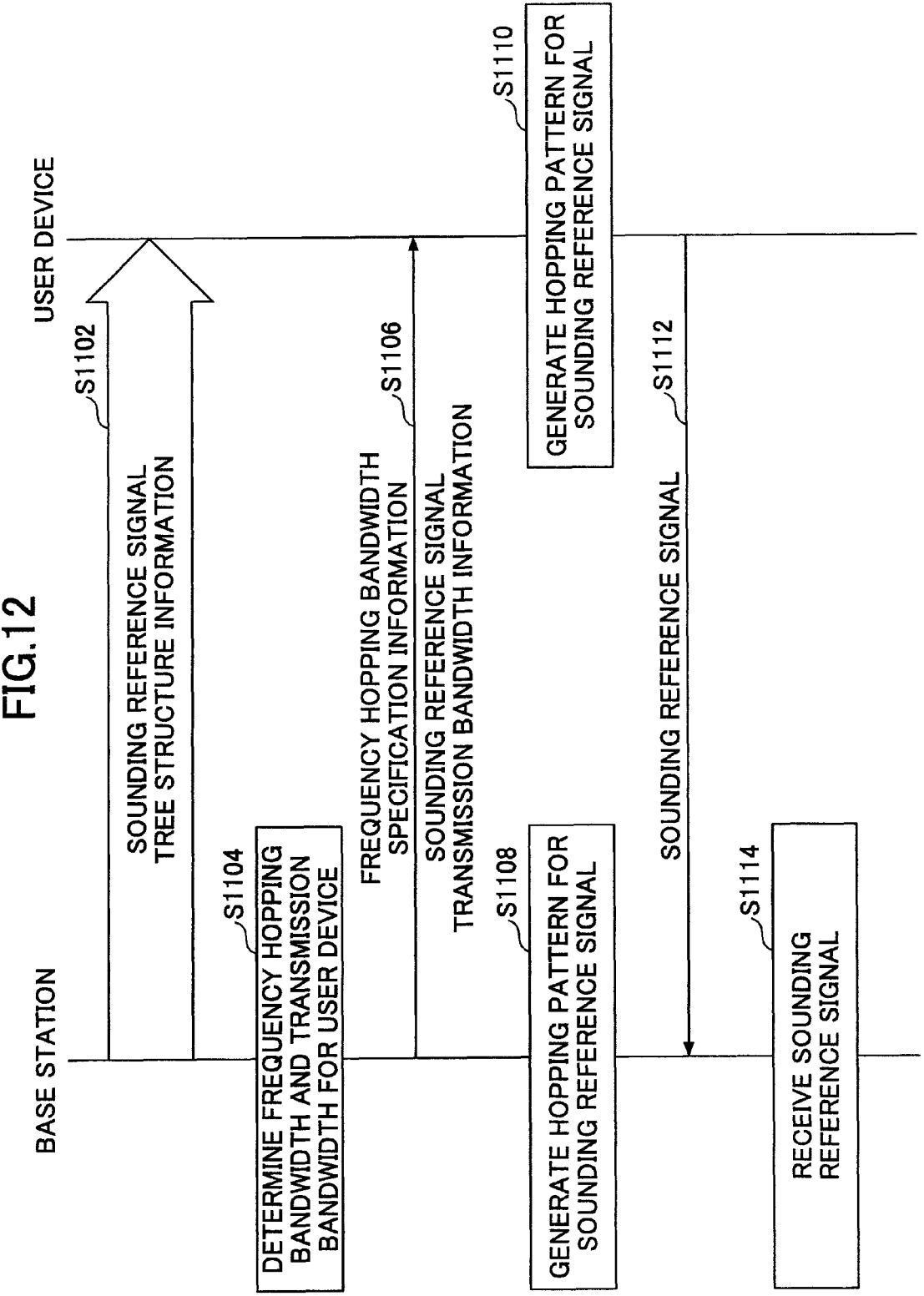
FIG. 12 is a sequence chart showing a process in a radio communication system according to an embodiment of the present invention.
Figure 13:
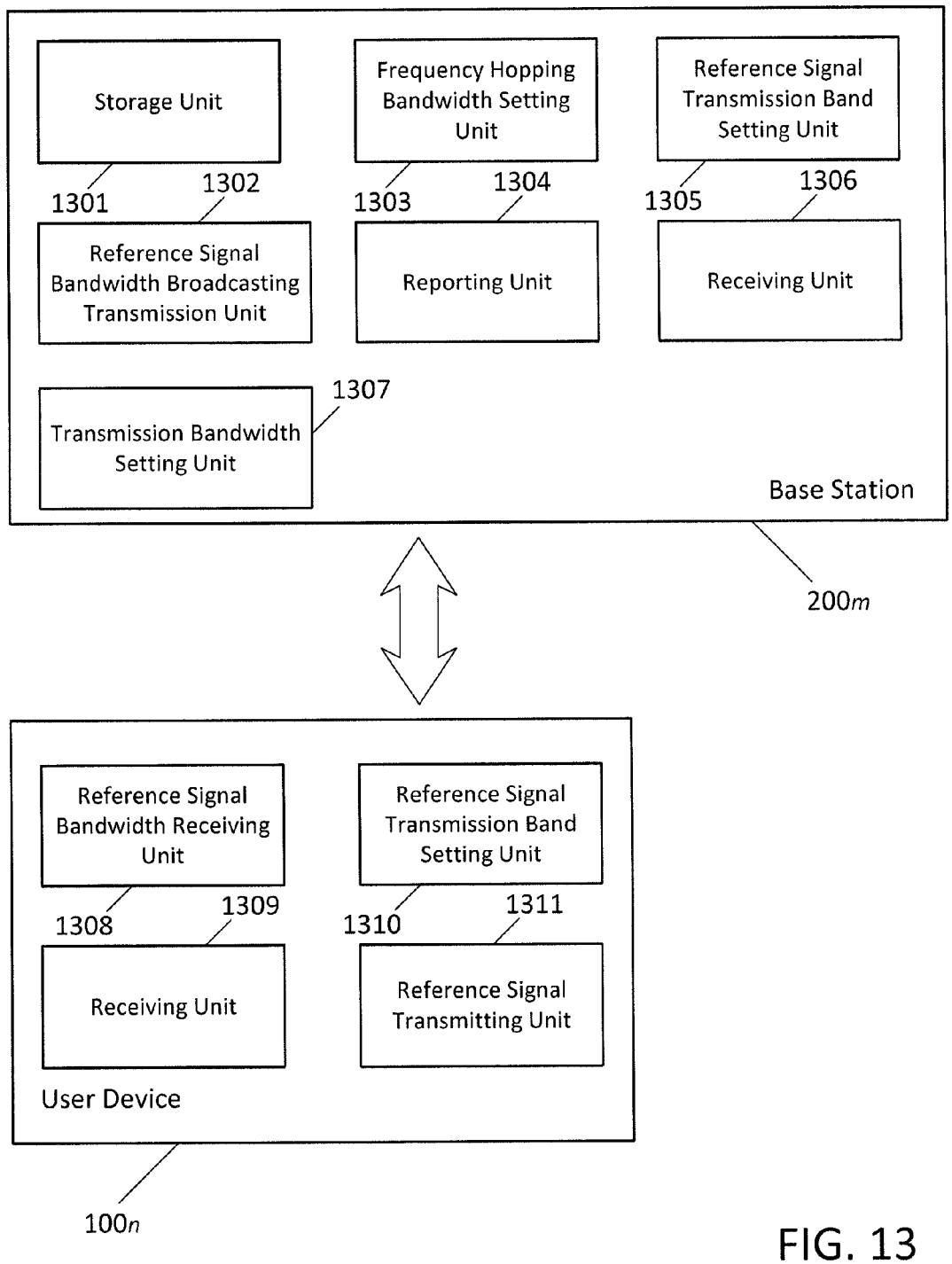
FIG. 13 is a block diagram of a base station and a user device according to an embodiment of the present invention.

FIG. 12 shows a case where the base station 200 broadcasts the sounding reference signal tree structure information to the user devices 100 in the cell and reports the sounding reference signal transmission bandwidth information as dedicated control information to each of the user devices 100. In step S1102 of FIG. 12, the base station 200 reports the sounding reference signal tree structure information to the user device 100. In step S1104, the base station 200 determines a frequency hopping bandwidth and a transmission bandwidth for the user 100. In step S1106, the base station 200 transmits frequency hopping bandwidth specification information and sounding reference signal transmission bandwidth information to the user device 100.

When a bandwidth other than the maximum system bandwidth is to be used as the frequency hopping bandwidth for the sounding reference signal, the base station 200 may be configured to determine the amount of shift in a pattern for changing the transmission frequency of the sounding reference signal. For example, the base station 200 may be configured to determine the amount of shift when determining the frequency hopping bandwidth. This configuration makes it possible to reduce unused frequency bands and thereby makes it possible to improve the frequency efficiency.

The above embodiment makes it possible to improve the reception quality at the base station of the sounding reference signal transmitted from the user device located at the cell edge.

Also, the above embodiment makes it possible to control the frequency hopping bandwidth for the sounding reference signal and thereby makes it possible to improve the frequency efficiency of the entire system.

Further, the above embodiment makes it possible to determine the frequency hopping bandwidth such that the interference with a sounding reference signal transmitted from a user device in a neighboring cell is reduced.

In the above embodiment, it is assumed that the radio communication system 1000 is based on Evolved UTRA and UTRAN (also called Long Term Evolution or Super 3G). However, a base station, a user device, and a communication control method according to the present invention may also be used for any system employing an FDMA scheme, such as SC-FDMA, for uplink.

As those skilled in the art will readily appreciate from the above description, in one or more embodiments of the present invention, each base station $200_m$ may include a storage unit 1301, a reference signal bandwidth broadcasting transmission unit 1302, a frequency hopping bandwidth setting unit 1303, a reporting unit 1304, a reference signal transmission band setting unit 1305, a receiving unit 1306, and a transmission bandwidth setting unit 1307. As those skilled in the art will readily appreciate from the above description, in one or more embodiments of the present invention, each user device $100_n$ may include a reference signal bandwidth receiving unit 1308, a receiving unit 1309, a reference signal transmission band setting unit 1310, and a reference signal transmitting unit 1311.

Although specific values are used in the above descriptions to facilitate the understanding of the present invention, the values are just examples and other appropriate values may also be used unless otherwise mentioned.

EXPLANATION OF REFERENCES $50_k$ ($50_1$, $50_2$, ..., $50_k$) Cell
$100_n$ ($100_1$, $100_2$, $100_3$, ..., $100_n$) User device
102 Sounding reference signal generating unit
104 Sounding reference signal hopping pattern generating unit
106 Frequency position shifting unit
108 SC-FDMA transmission unit
$200_m$ ($200_1$, $200_2$, $200_3$, ..., $200_m$) Base station
202 Receiving unit
204 Sounding reference signal receiving unit
206 Sounding reference signal hopping pattern generating unit
208 Frequency hopping bandwidth determining unit
300 Access gateway
400 Core network

The invention claimed is:

1. A base station for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth, the base station comprising:
a storage unit configured to store reference signal bandwidth information indicating the hierarchical reference signal bandwidths for each of the system frequency bands;
a reference signal transmission bandwidth broadcasting unit configured to select the reference signal bandwidth information corresponding to one of the reference signal transmission bandwidths being used by the base station from the storage unit and to broadcast the selected reference signal bandwidth information;
a frequency hopping bandwidth setting unit configured to set a frequency hopping bandwidth for frequency hopping of a reference signal;
a reporting unit configured to report, to a user device, the frequency hopping bandwidth and one of the reference signal bandwidths as information on an assigned reference signal transmission bandwidth;
a reference signal transmission band setting unit configured to set a reference signal transmission frequency band within the frequency hopping bandwidth based on the reference signal bandwidth information broadcast by the reference signal transmission bandwidth broadcasting unit and the information on the assigned reference signal transmission bandwidth reported by the reporting unit; and
a receiving unit configured to receive the reference signal to be transmitted from the user device using the reference signal transmission frequency band set by the reference signal transmission band setting unit.

2. The base station as claimed in claim 1, wherein the storage unit is configured to store information, which includes a number into which the higher-order reference signal bandwidth is divided and a reference signal bandwidth obtained by dividing the higher-order reference signal bandwidth, for the lower-order reference signal bandwidth lower than the highest-order reference signal bandwidth.

3. The base station as claimed in claim 1, wherein the storage unit is configured to store the reference signal transmission bandwidths narrower than the corresponding system frequency bands in association with the system frequency bands.

4. The base station as claimed in claim 1, wherein the frequency hopping bandwidth setting unit is configured to set the frequency hopping bandwidth such that interference with a reference signal transmitted from a user device in a neighboring cell is reduced.

5. The base station as claimed in claim 1, further comprising:
a transmission bandwidth setting unit configured to set the assigned reference signal transmission bandwidth based on a location of the user device in a cell.

6. The base station as claimed in claim 5, wherein the transmission bandwidth setting unit is configured to make the assigned reference signal transmission bandwidth for a user device located at a cell edge narrower than the assigned reference signal transmission bandwidth for a user device other than the user device located at the cell edge.

7. A user device for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth, the user device comprising:
a reference signal bandwidth receiving unit configured to receive, from a base station, reference signal bandwidth information indicating the hierarchical reference signal bandwidths corresponding to one of the reference signal transmission bandwidths used for the user device;
a receiving unit configured to receive, from the base station, a frequency hopping bandwidth for frequency hopping of a reference signal and one of the reference signal bandwidths as information on an assigned reference signal transmission bandwidth;
a reference signal transmission band setting unit configured to set a reference signal transmission frequency band within the frequency hopping bandwidth based on the reference signal bandwidth information received by the reference signal bandwidth receiving unit and the information on the assigned reference signal transmission bandwidth received by the receiving unit; and
a reference signal transmitting unit configured to transmit the reference signal using the reference signal transmission frequency band set by the reference signal transmission band setting unit.

8. A communication control method performed by a base station communicating with a user device and adapted for a system where multiple reference signal transmission bandwidths are defined in association with system frequency bands and hierarchical reference signal bandwidths are defined for each of the reference signal transmission bandwidths such that a lower-order reference signal bandwidth lower than a highest-order reference signal bandwidth is a division of a higher-order reference signal bandwidth, the method comprising:

a reference signal transmission bandwidth broadcasting step of selecting, from a storage unit storing reference signal bandwidth information indicating the hierarchical reference signal bandwidths for each of the system frequency bands, the reference signal bandwidth information corresponding to one of the reference signal transmission bandwidths being used by the base station and broadcasting the selected reference signal bandwidth information;

a frequency hopping bandwidth setting step of setting a frequency hopping bandwidth for frequency hopping of a reference signal;

a reporting step of reporting, to the user device, the frequency hopping bandwidth and one of the reference signal bandwidths as information on an assigned reference signal transmission bandwidth;

a reference signal transmission band setting step of setting a reference signal transmission frequency band within the frequency hopping bandwidth based on the reference signal bandwidth information broadcast in the reference signal transmission bandwidth broadcasting step and the information on the assigned reference signal transmission bandwidth reported in the reporting step; and a receiving step of receiving the reference signal to be transmitted from the user device using the reference signal transmission frequency band set in the reference signal transmission band setting step.

* * * * *